United States Patent
Wan et al.

(10) Patent No.: US 9,299,167 B2
(45) Date of Patent: Mar. 29, 2016

(54) IMAGE PROCESSING METHODS AND APPARATUS USING LOCALIZED GAMUT DEFINITIONS

(75) Inventors: Chun Chi Wan, Mountain View, CA (US); Neil W. Messmer, Langley (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 120 days.

(21) Appl. No.: 13/877,280

(22) PCT Filed: Sep. 6, 2011

(86) PCT No.: PCT/US2011/050484
§ 371 (c)(1),
(2), (4) Date: Apr. 1, 2013

(87) PCT Pub. No.: WO2012/054143
PCT Pub. Date: Apr. 26, 2012

(65) Prior Publication Data
US 2013/0194321 A1    Aug. 1, 2013

Related U.S. Application Data

(60) Provisional application No. 61/394,294, filed on Oct. 18, 2010.

(51) Int. Cl.
*G06T 11/40* (2006.01)
*G06K 9/00* (2006.01)
(Continued)

(52) U.S. Cl.
CPC . *G06T 9/007* (2013.01); *G06K 9/00* (2013.01); *G06T 11/40* (2013.01); *G09G 5/02* (2013.01); *H04N 1/46* (2013.01); *H04N 1/644* (2013.01); *H04N 9/67* (2013.01); *H04N 1/6066* (2013.01)

(58) Field of Classification Search
CPC ............. G09G 5/02; H04N 7/26; H04N 5/46; H04N 13/04; G06K 9/46; G06K 9/00; G06K 9/36; G03H 1/08; G06T 11/40; G03F 3/08
USPC ......... 345/589, 590, 690; 348/51, 557; 359/9; 375/240; 382/162, 166, 251, 167; 358/1.9
See application file for complete search history.

(56) References Cited

U.S. PATENT DOCUMENTS 5,828,413 A    10/1998  Jayant
6,414,690 B1 *  7/2002  Balasubramanian et al.  345/589
(Continued)

FOREIGN PATENT DOCUMENTS

CN    101248677      8/2008
WO    2009/000904    12/2008

OTHER PUBLICATIONS

Gershikov, E. et al. "Optimal Color Image Compression Using Localized Color Components Transforms" EUSIPCO, 2008.
(Continued)

*Primary Examiner* — Nicholas Lee
*Assistant Examiner* — Abdul-Samad A Adediran
(74) *Attorney, Agent, or Firm* — Larry E. Henneman, Jr.; Henneman & Associates, PLC

(57) ABSTRACT

Methods and apparatus are provided for encoding and decoding image data using localized gamut definitions. The localized gamut definitions may be defined based on gamut characteristics of the image data. A gamut transform is applied to the image data wherein color coordinates specified by the image data are mapped to corresponding color coordinates in the localized gamut definition. Use of localized gamut definitions may facilitate image data compression of increased color depth specification of image data.

26 Claims, 11 Drawing Sheets

(51) Int. Cl.
  *G06T 9/00* (2006.01)
  *H04N 1/46* (2006.01)
  *H04N 9/67* (2006.01)
  *G09G 5/02* (2006.01)
  *H04N 1/64* (2006.01)
  *H04N 1/60* (2006.01)

(56) References Cited

U.S. PATENT DOCUMENTS

| | | |
|---|---|---|
| 6,633,668 B1 | 10/2003 | Newman |
| 6,640,005 B1 | 10/2003 | Westerman |
| 6,865,291 B1 | 3/2005 | Zador |
| 6,909,745 B1 | 6/2005 | Puri |
| 7,343,037 B1 | 3/2008 | Kadatch |
| 7,627,180 B2 | 12/2009 | Tabuchi |
| 2003/0234943 A1 | 12/2003 | Van Bael |
| 2006/0280360 A1* | 12/2006 | Holub ............ 382/162 |
| 2007/0076971 A1* | 4/2007 | Roimela et al. ............ 382/251 |
| 2007/0211272 A1* | 9/2007 | Kang et al. ............ 358/1.9 |
| 2008/0278574 A1* | 11/2008 | Ramstad ............ 348/51 |
| 2009/0285478 A1* | 11/2009 | Thiebaud et al. ............ 382/166 |
| 2010/0014134 A1* | 1/2010 | Cable ............ 359/9 |
| 2010/0027686 A1* | 2/2010 | Zuo et al. ............ 375/240.29 |
| 2010/0054581 A1 | 3/2010 | Bala |
| 2010/0054591 A1 | 3/2010 | Shiraishi |
| 2010/0067579 A1 | 3/2010 | Bandoh |
| 2010/0150441 A1 | 6/2010 | Evans |
| 2010/0157154 A1* | 6/2010 | Kobayashi et al. ............ 348/557 |
| 2011/0157212 A1* | 6/2011 | Zhang et al. ............ 345/590 |
| 2012/0081385 A1* | 4/2012 | Cote et al. ............ 345/589 |

OTHER PUBLICATIONS

Goffman-Vinopal, L. "Color Image Compression Using Inter-Color Correlation" IEEE, ICIP, 2002, pp. II 353-356.
Goffman-Vinopal, L. "The Effect of Intercolor Correlation on Color Image Compression" submitted to the Senate of the Technion Israel Institute of Technology Jan. 2001.
Roterman, Y. et al. "Content-Based Compression in Aerial Imaging Using Inter-Color Correlation" ISPRS Archives, vol. XXXV Part B3, 2004.
Roterman, Y. et al. "Progressive Image Coding Using Regional Color Correlation" 4th EURASIP Conference focused on Video/Image Processing and Multimedia Communications, Jul. 2-5, 2003, Croatia.
Roterman, Y. et al. "Color Image Coding Using Regional Correlation of Primary Colors" Image and Vision Computing, vol. 25, Issue 5, May 1, 2007, pp. 637-651.
Baudot, Yves "A New Approach to Satellite Images Classification Using a Color Data Compression Algorithm" Remote Sensing Science for the Nineties, Maryland, May 20-24, 1990, vol. 3, pp. 2001-2004.
IBM "Color Graphics Picture Segmentation" IBM Technical Disclosure Bulletin, International Business Machines Corp. vol. 32, No. 3B, Aug. 1, 1989, pp. 384-387.
Tremblay, M. et al "Transmission of the Color Information Using Quad-Trees and Segmentation-Based Approaches for the Compression of Color Images With Limited Palette" Proc. of the International Conference on Image Processing, Nov. 13-16, 1994, vol. 3, pp. 967-971.
Bing, Z. et al "An Adjustable Algorithm for Color Quantization" Pattern Recognition Letters, Elsevier, Amsterdam, NL, vol. 25, No. 16, Dec. 1, 2004, pp. 1787-1797.

\* cited by examiner

IMAGE PROCESSING METHODS AND APPARATUS USING LOCALIZED GAMUT DEFINITIONS

CROSS-REFERENCE TO RELATED APPLICATIONS

This application is the U.S. national stage of International Application PCT/US2011/050484, filed 6 Sep. 2011, which in turn claims priority to U.S. Patent Provisional Application No. 61/394,294, filed 18 Oct. 2010, each of which is hereby incorporated by reference its entirety.

TECHNICAL FIELD

This invention relates to image processing, image data compression, image display and image reproduction. Embodiments of the invention provide methods and apparatus which process image data for transmission to and display on a downstream device.

BACKGROUND

Image data (including video data and still image data) can have any one of a wide variety of different formats. Some example image data formats are: RGB, YLU, GIF, TIFF, JPEG/JIF, PNG, BMP, PDF, RAW, FITS, MPEG, MP4, high dynamic range (HDR) formats such as BEF, HDRi, JPEG XR, JPEG HDR, RGBE, ScRGB and many others. Image data formats can have capabilities that differ significantly in areas such as, for example, the range of different colors (i.e. gamut) that can be specified, the range of luminance levels (i.e. dynamic range) that can be specified, the number of discrete colors within the gamut that can be specified, the number of discrete luminance levels that can be specified, and the like. Some image data formats have multiple versions having different capabilities.

Colors may be specified in many different color spaces. Some examples include RGB, HSV, CIE LUV, YCbCr, YIQ, xvYCC, HSL, XYZ, CMYK, CIE LAB, IPT, and others. Different image data formats may specify colors in different color spaces.

Displays may incorporate any of a wide variety of underlying display technologies. Display technologies range from digital cinema displays to television sets which may comprise: liquid crystal display (LCD) panel displays in which the LCD panel is backlit by various types of backlight systems; light-emitting diode (LED) displays; organic LED displays (OLED displays); plasma displays; cathode ray tube (CRT) displays; laser projectors; digital mirror device (DMD) displays; electroluminescent displays; and the like. Within any of these general technologies a wide variety of different constructions and compositions for light-emitting and/or filtering elements are possible. As a result, different displays may have capabilities that differ significantly in areas such as, for example, the range of different colors (i.e. gamut) that can be displayed, the range in luminance values that can be displayed (i.e. the dynamic range of the display), and the like.

A wide gamut display may be capable of reproducing colors which are outside of the gamut that can be displayed on conventional displays. However, the range and number of discrete colors that can be specified by the image data provided to a display may be constrained by several factors, such as, for example, capabilities of the image data format, image data bandwidth, image data compression, and the like.

There is a need for methods and apparatus for processing and displaying image data with different gamuts. There is a need for methods and apparatus for processing and displaying image data so as to reproduce on a display different colors with a high degree of precision. There is a particular desire for methods and apparatus that can convey image data in an efficient manner to a display or other downstream device, and that can operate within the constraints of different image data formats, available image data bandwidth, and image data compression.

SUMMARY

A range of aspects of the invention and example embodiments of the invention are described below and illustrated in the accompanying drawings.

BRIEF DESCRIPTION OF DRAWINGS

The accompanying drawings illustrate non-limiting embodiments of the invention.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Colors can be represented in a three-dimensional or three-component color space. The content gamut can be defined as the range of the color space occupied by a local group of pixels in image data. The gamut of an image data format can be defined as the range of the color space that may be specified by the image data format. An image data format specifying colors in a three-component color space using four bits per component, for example, allows for the specification of up to $(2^4)^3$ or 4096 colors or component combinations within the gamut of the image data format. Unless a large sample of image data is being considered (e.g. a long sequence of frames), a local group of pixels in the image data is not likely to require all possible colors that can be specified by the image data format. Moreover, it can be appreciated that certain color component combinations tend to occur in the image data more frequently than other color component combinations.

Particular embodiments of the methods and apparatus described herein may be applied where one or more frames or areas of a frame of image data do not use the full gamut that may be specified by the image data format. In such cases, the image data may be encoded using localized gamut definitions. As explained below, use of localized gamut definitions may facilitate image data compression, increased color depth specification of image data, and processing of image data by downstream devices of a video delivery pipeline.

Figure 1A:
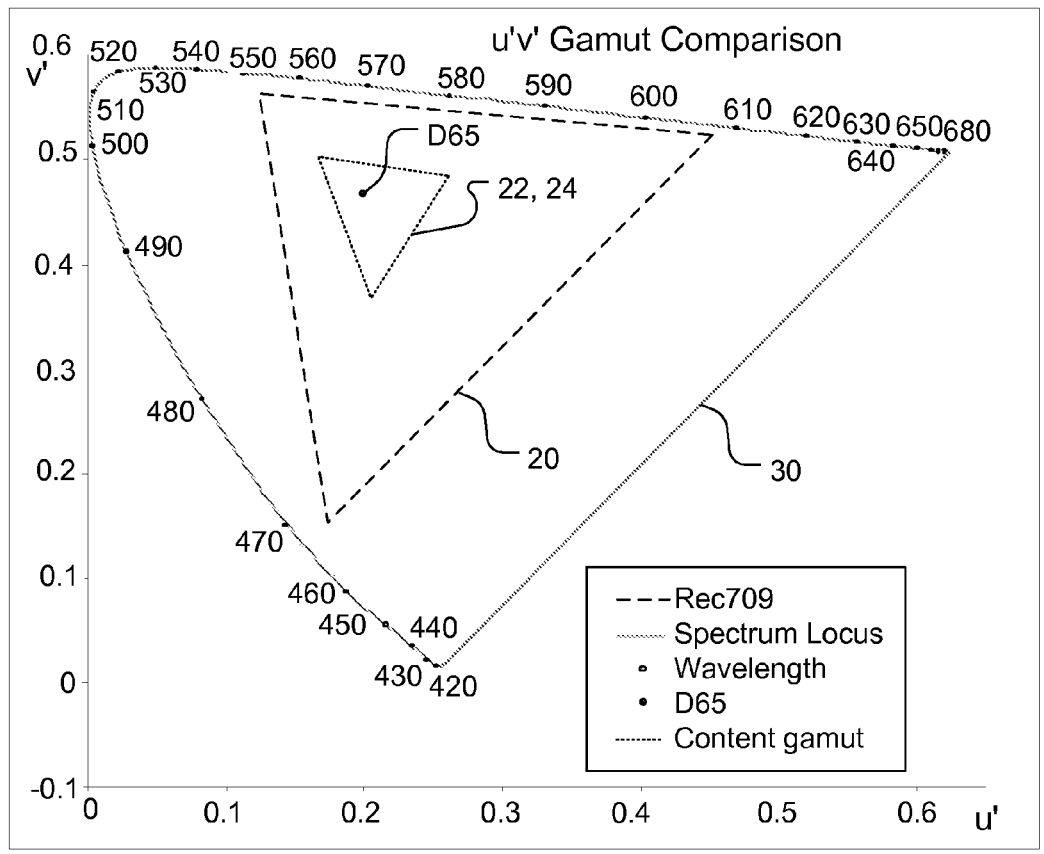
FIGS. 1A and 1B are gamut diagrams in CIE u'v' color space.
Figure 1B:
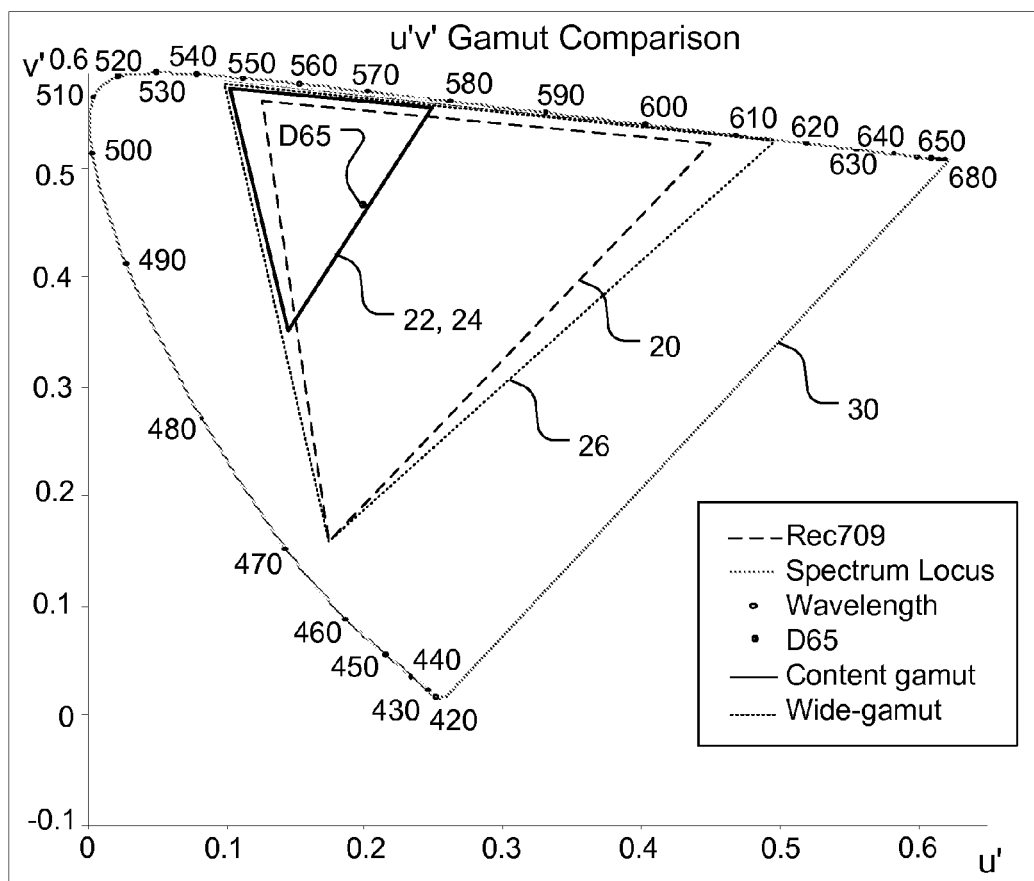

FIGS. 1A and 1B, for example, illustrate cases where the area of the content gamut (range of colors occupied by a local group of pixels in image data), as bounded by a content gamut boundary 22, occupies a fraction of the area of the entire gamut of the image data's respective image data formats. In FIG. 1A, the image data can be assumed to be in Rec. 709 format having a gamut bounded by gamut boundary 20. In FIG. 1B, the image data can be assumed to be in a wide gamut format (i.e. having a broader gamut than Rec. 709 format) having a gamut bounded by gamut boundary 26. For each of these cases, the image data may be encoded using a localized gamut definition which may be determined based at least in part on content gamut boundary 22. Also plotted on FIGS. 1A and 1B for reference purposes are spectrum locus 30 (the locus of points representing pure spectral or monochromatic colors) and CIE Standard Illuminant D65 (white point representing average daylight). It is to be understood that FIGS. 1A and 1B illustrate gamut boundaries in a two-dimensional space for ease of illustration. As noted above, colors can be represented in a three-dimensional or three-component color space. Color information specified in a three-dimensional color space may be transformed to a color space where chromatic information is specified along two axes (such as shown in FIGS. 1A and 1B) and luminance information is specified along a third axis (not shown in FIGS. 1A and 1B).

In the case illustrated by FIG. 1A, a localized gamut may be defined having a localized gamut boundary 24 that coincides with content gamut boundary 22. In other embodiments, localized gamut boundary 24 may surround or encompass content gamut boundary 22 and/or be proximate to content gamut boundary 22. The origin of the color space occupied by the localized gamut may be defined at some point within the localized gamut. During encoding of the image data, the color coordinates specified in the image data may be mapped to corresponding color coordinates in the localized gamut. Because the localized gamut encompasses a fraction of the area of the gamut of the image data format, a reduced number of bits may be used to represent color coordinates within the localized gamut. Localized gamut definitions may therefore be employed in such cases to reduce the amount of data used to represent the image.

Bandwidth limitations for wireless or wired transmission of data may limit the amount of image data that can be transmitted to a display. Accordingly, it may be desirable to apply localized gamut definitions such as described above with reference to FIG. 1A so as to reduce the amount of data needed to represent the colors in an image while preserving the original color depth of the image.

In other embodiments, localized gamut definitions may be employed to decrease the sizes of the steps between colors (i.e. decrease the quantization levels between colors) that may be specified within regions of the gamut of the image data format, thereby increasing the precision with which colors may be specified. The color depth, or number of colors within a particular gamut that can be represented in an image at one time, is limited by the number of bits used to represent the color of each pixel (i.e. the "bit depth"). For example, suppose that the content gamut of the image data to be encoded is bounded by content gamut boundary 22 of FIG. 1A, and a 16-bit depth color scheme (using 5 bits to represent 32 levels of red, 6 bits to represent 64 levels of green, and 5 bits to represent 32 levels of blue, for a total of 32×64×32 or 65,536 different colors) is being used to represent all of the available colors within the Rec. 709 format shown bounded by gamut boundary 20. In some image frames or frame areas, all 65,536 levels of colors that may be specified by such color scheme may not be used; accordingly to decrease the quantization levels between colors a new localized gamut definition may be applied in which all 65,536 levels of colors are redefined to colors within the localized gamut. Use of localized gamut definitions may increase the color depth within the localized gamut (thereby decreasing quantization levels between colors) at the expense of the color depth outside of the localized gamut. For example, if a localized gamut is defined within the Rec. 709 format having a localized gamut boundary 24 that coincides with content gamut boundary 22, then a new 16-bit depth color scheme may be defined to represent all of the available colors within the localized gamut, thus increasing the number of colors that may be specified within the localized gamut to 65,536 (i.e. 32×64×32).

It may be desirable to increase the color depth using localized gamut definitions in certain cases where the display is capable of reproducing colors at a greater color depth than may be specified by the image data format, and/or where finer control of the quantization levels between colors is desired. For example, as illustrated by FIG. 1B, if the bit depth is constant between the different image data formats, the precision in color specification of image data in the wide gamut format (having a gamut bounded by gamut boundary 26) will be less than for image data in a less wide gamut format such as Rec. 709 format (having a gamut bounded by gamut boundary 20). The differences between quantization levels for colors in the wider gamut are necessarily larger to allow colors to be specified throughout the increased gamut area. To increase the precision with which colors can be specified, one can provide image data in a higher bit depth but in many cases this may not be practical.

In the FIG. 1B example, the image data is in a wide gamut format and some colors of the content gamut (defined by gamut boundary 22) are outside of the Rec. 709 gamut. The content gamut of the image data occupies a fraction of the area of the gamut of the wide gamut format shown bounded by gamut boundary 26. To increase the precision with which colors in the image data can be represented, a localized gamut may be defined for the image data having a localized gamut boundary 24 that coincides with or encompasses content gamut boundary 22. A new color scheme may be defined to represent the colors within this localized gamut. The color coordinates specified in the image data may be mapped to corresponding color coordinates in the localized gamut.

An example to illustrate how color depth may be increased by using localized gamut definitions is as follows: suppose the full gamut of the image data format is described by N combinations of color component codewords, and the local content gamut is small compared to the full gamut of the image data format (e.g. the local content gamut requires a subset of the N possible combinations). The local content gamut boundary can be determined and the N codewords can be reassigned to occupy a color space up to the local content gamut boundary. The N codewords can therefore be used to specify colors in a smaller region of the full gamut of the image data format, at a higher color resolution (color depth) than previously.

The new color scheme used with a localized gamut definition may have the same bit depth as the image data format. In other cases, the new color scheme used with a localized gamut definition may have a decreased bit depth as the image data format while still allowing for specification of colors within the localized gamut at the desired color depth.

In some embodiments, a new color scheme for a localized gamut definition may be selected and used by a professional color grader during post-production processing of image data in order to specify colors with greater precision than would be permitted by the image data format's existing color scheme. In other embodiments, a new color scheme for a localized gamut definition may be determined or retrieved by a downstream device and used to enhance the color specification of processed image data which has had gamut compression applied (e.g. processing which compresses wide gamut image data to the constraints of a more conventional gamut, e.g. Rec. 709 gamut).

Where image data is encoded using a localized gamut definition, information concerning the localized gamut definition may be communicated to a downstream device to enable the downstream device to decode the image data. Such information may be encoded as metadata in the image data, or it may be communicated as metadata ahead of the frames of image data, such as at the commencement of a movie, broadcast, scene, etc. A downstream device (e.g. set-top box or display processor) may decode the image data for display by extracting the localized gamut information from the image data and applying such information to translate the color coordinate values defined using the localized gamut definition, to color coordinate values for reproduction on a display. The remapped color coordinate values may have the same format and definition as ordinary color coordinate values, so that transmission, display, etc. of the image data is not affected.

Prior to display, the decoded image data is optionally filtered by a downstream device to reduce visual artifacts that may appear in the image data after decoding. The visual artifacts may result from the application of different localized gamut definitions between frames or frame areas for encoding the image data.

In particular embodiments, localized gamut information may be used at stages in a video delivery pipeline to facilitate specification of color information and operations that depend on local color characteristics. A typical video delivery pipeline includes various stages such as, for example, content capture, post-production editing, encoding, transmission, decoding and display. Localized gamut information that is generated earlier in the pipeline by an upstream device may be passed down the pipeline (e.g. by way of metadata) to guide one or more downstream devices in processing the video data. Downstream devices may use local color characteristics to, for example: enhance details in an image, mask or suppress noise or artifacts, perform local tone mapping, and/or determine local gamut required by a colored backlight in dual modulation displays. The overall computational cost of such operations may be reduced by using localized gamut information which has been pre-computed by an upstream device and provided to the downstream device.

Figure 2A:
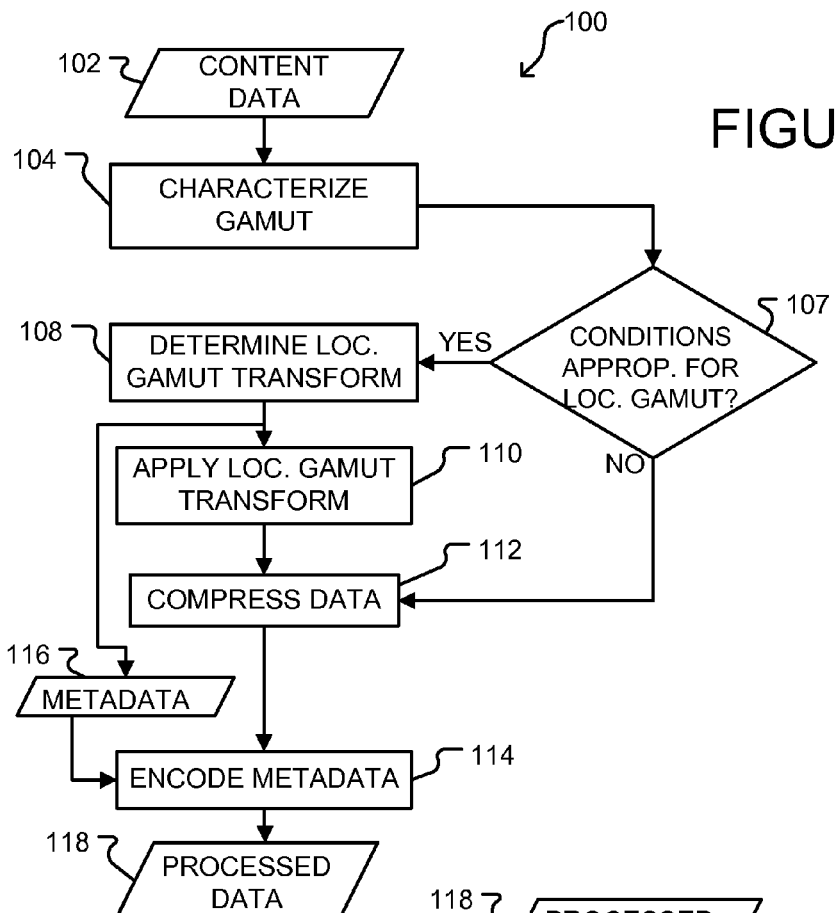
FIGS. 2A and 2C are flow charts of methods of encoding image data according to example embodiments.

FIG. 2A illustrates a method 100 of using localized gamut definitions to encode image data according to one embodiment. Method 100 begins by receiving content image data 102, which may comprise one or more frames or areas of a frame of image data. Image data 102 may comprise video data, for example. The content gamut of the image data 102 is characterized at block 104. Block 104 gamut characterization may comprise, for example, determining one or more of the following:

a boundary which encompasses all points of a content gamut or a portion of the content gamut;
the area within the boundary which encompasses all points of the content gamut or a portion of the content gamut;
statistical information about the color coordinates or color information specified for a local group of pixels, such as average values, standard deviation, variance, maximum and minimum values, etc.

Gamut characterization methods are also discussed below with reference to FIGS. 3A to 3C.

At block 107, the gamut characterization determined at block 104 is evaluated to determine whether conditions are appropriate for applying a localized gamut transform to the image data. If it is determined at block 107 that conditions are appropriate, then a localized gamut for image data 102 is determined or retrieved at block 108. The localized gamut may be selected from a set of predetermined localized gamut definitions or it may be generated for image data 102 based on the block 104 gamut characterization. Methods of determining localized gamut definitions are discussed below with reference to FIGS. 3A to 3C. The localized gamut definition may be specified for blocks or other areas of an image. In some embodiments, the frame may be divided into a number of subframe blocks, one or more of which may be associated with localized gamut definition(s). In other embodiments, the area for which a localized gamut is associated may be defined with respect to gamut characteristics of the image (e.g. the localized gamut may be specified for object(s) or area(s) within the frame having similar tones).

The block 108 localized gamut may be defined by a gamut boundary which coincides with or surrounds the content gamut. The gamut boundary may be represented in any of several ways, such as, for example:

a set of points that is a sub-set of points in an existing gamut (e.g. Rec. 709 gamut); and a polynomial representation.

Examples of a localized gamut boundary 24 corresponding to a content gamut defined by content gamut boundary 22 are depicted in FIGS. 1A and 1B. The localized gamut may be in the same or different color space than the gamut of the image data format. The origin of the color space in which the localized gamut is defined may be located at some point within the localized gamut, but this is not necessary and the origin may be defined at some other location. In certain embodiments, the origin may be located at an average value of the image data's color coordinate values.

At block 110, a localized gamut transform is applied to the image data to map color coordinates specified by image data 102 to corresponding color coordinates in the localized gamut. In some embodiments, a new color scheme may be defined to represent color coordinates in the localized gamut. The new color scheme may have the same or different bit-depth than the image data format; the bit-depth determines the precision with which colors may be specified in the localized gamut. For example, in cases where the content gamut occupies a fraction of the area of the gamut of a conventional or non-wide gamut format (e.g. the case illustrated by FIG. 1A), then it may not be necessary to use the full bit-depth for the image data, and a decreased bit-depth may be used to represent color coordinates within the localized gamut. On the other hand, in cases where the content gamut occupies a fraction of the area of the gamut of a wide-gamut format, and at least a portion of the content gamut is outside the gamut of a conventional or non-wide gamut format (e.g. the case illustrated by FIG. 1B), then the full bit-depth of the image data format may be used to represent all of the available colors within the localized gamut to the desired precision level.

The localized gamut transform at block 110 may be performed by way of, for example:
- look-up tables (LUTs);
- a function which accepts input values and translates them to corresponding output values in the localized gamut; etc.

In certain embodiments, for purposes of characterizing gamut, evaluating gamut characteristics, determining a localized gamut transform, and/or applying a localized gamut transform (i.e. blocks 104, 107, 108, and/or 110 of method 100A), color information may be transformed from its original color space into another color space. The new color space may be more convenient for visual and perceptual analysis. The transformation to the new color space may facilitate image data processing and a more efficient representation of image data. The transformation to the new color space may be nonlinear.

Statistical information about the image data color signals evaluated in the original color space may translate to different statistical values in the new color space. In characterizing gamut, statistical measures such as average value, maximum value, minimum value, standard deviation, variances, or the like, can be considered for a local group of pixels in the original and/or new color space. Some bounding description such as distance from average values can also be considered.

According to some embodiments, one or more transforms may be applied at block 110 to reduce the range of the transformed color signal information while preserving significant color characteristics. In some embodiments, by testing nonlinear transforms on various statistical measures, an optimal transform can be selected and applied to compact the color signal information while minimizing or reducing the distortion of significant color characteristics. According to particular embodiments, a nonlinear transform is applied, and subsequently a general optimal linear transform (e.g. singular value decomposition or principle component analysis) is applied to further compact the color signal information.

At block 112, image data 102 is compressed. Compression may be performed using one or more techniques suitable for the image data format, such as, for example:
- transform encoding, such as by way of discrete cosine transforms (DCTs), as may be used with JPEG image data and MPEG video data, for example;
- predictive encoding, as may be used with MPEG video data, for example;
- lossless compression (e.g. Lempel-Ziv-Welch compression), as may be used with GIF and TIFF image data, for example;
- wavelet-based compression;
- a combination of one or more of the above;
- and the like.

In some embodiments, the residual image data (i.e. the difference between input or previous frame image data and the predicted output or next frame image data after prediction techniques are applied) is encoded using standard image encoding techniques (e.g. DCT, frequency-dependent or independent quantization, frequency scan ordering, fixed or variable run-length encoding, and the like). The predictions are performed using inter or intra-frame prediction techniques. Frames may be divided into local subframe blocks. Each successive block is predicted by using previously encoded image data. The residual image data carries some statistical information of the input image and some new local statistical information due to the block-based prediction techniques. Local gamut representation techniques as described herein can be applied to residual image data.

Figure 5:
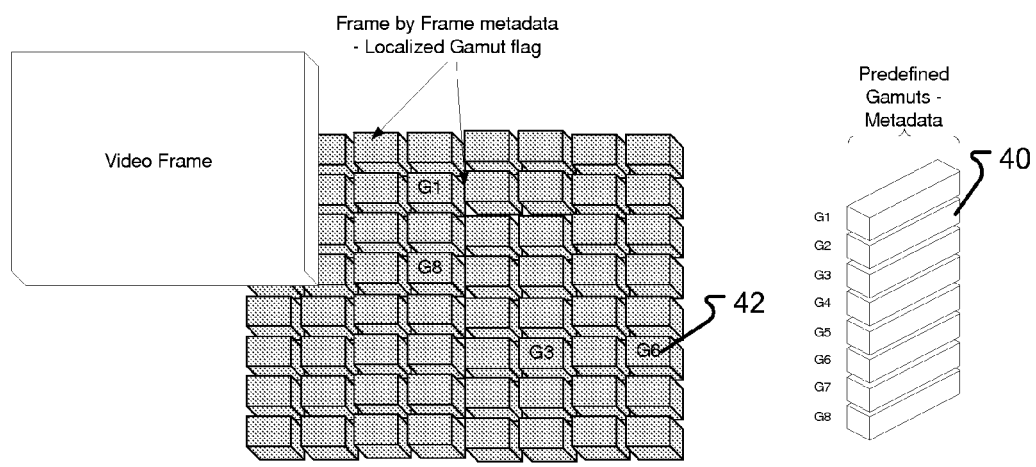
FIG. 5 illustrates predefined gamut definitions for use with areas of a frame of image data.

To assist downstream devices in processing and decoding the image data, at block 114 metadata 116 may be embedded in the image data, or may be transmitted along with the image data. Metadata 116 may provide information about the localized gamut definition for particular frames or areas of a frame. Metadata 116 may comprise, for example: an index to a library of localized gamut definitions 40 (FIG. 5) which are available to the downstream device; coordinates 42 identifying the area(s) of a frame to which a localized gamut definition (as specified by an index, for example) is applied (FIG. 5); information concerning a mapping function, or from which a look-up table can be derived (i.e. for mapping the color coordinates defined using the localized gamut definition back to color coordinates in the image data for reproduction on the display), etc. The processed and compressed image data 118 including metadata 116 is then output for transmission to a downstream device.

Localized gamut definitions may not be applied in every case. For example, in method 100, for certain frames or areas of a frame of image data, if it is determined by the block 107 evaluation of gamut characteristics that conditions are not appropriate for applying a localized gamut transform to the image data, then localized gamut definitions may not be applied. In such cases, method 100 may bypass the localized gamut determination and transform and proceed to compressing the image data at block 112. In some embodiments, metadata 116 may be communicated to the downstream device indicating that no localized gamut definitions were applied to such image data.

Figure 2B:
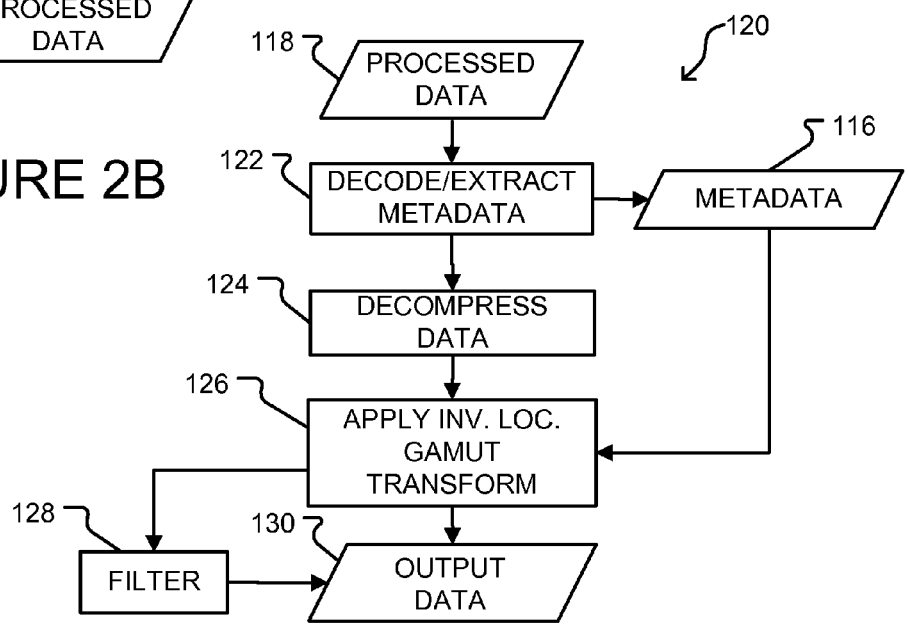
FIGS. 2B and 2D are flow charts of methods of decoding image data according to example embodiments.

Image data 118 which has been encoded in accordance with method 100 of FIG. 2A may be subsequently decoded by a display or other downstream device to prepare it for output to the display, as shown in method 120 of FIG. 2B, for example. Method 120 begins by receiving the processed image data 118. Method 120 proceeds to block 122 by extracting metadata 116 from image data 118. At block 124, the image data is decompressed. At block 126, color information of the decompressed image data is decoded by applying the inverse localized gamut transform to the image data. The block 126 inverse transform may be based at least in part on metadata 116 which guides the mapping from the color coordinate values of the applicable localized gamut definition, to color coordinate values of the image data format for reproduction on a display. For example, the downstream device which implements method 120 may have available to it a library of localized gamut definitions 40 (see FIG. 5). Metadata 116 may include localized gamut flags which are used to index the library of localized gamut definitions 40, and coordinates identifying the area(s) of a frame for which a particular localized gamut definition is applied (see FIG. 5). In some embodiments, the library of localized gamut definitions 40 may be configured using metadata 116.

In other embodiments, the block 126 transform may map from the color coordinate values of the applicable localized gamut definition, to color coordinate values within a different color space (e.g. RGB color space) for reproduction on the display.

At block 128 of method 120, the decoded image data is optionally filtered to reduce visual artifacts that may appear in the image data after decoding. The resulting filtered, decoded image data is output as output image data 130 to the display.

Some overhead is required for communicating the metadata 116 which allows downstream devices to decode the image data. Despite the increased overhead, where the area of the content gamut is a fraction of the area of the gamut of the image data format, greater compression of image data may be achieved in suitable circumstances by encoding the image data using localized gamut definitions (such as in the case illustrated by FIG. 1A).

Figure 3A:
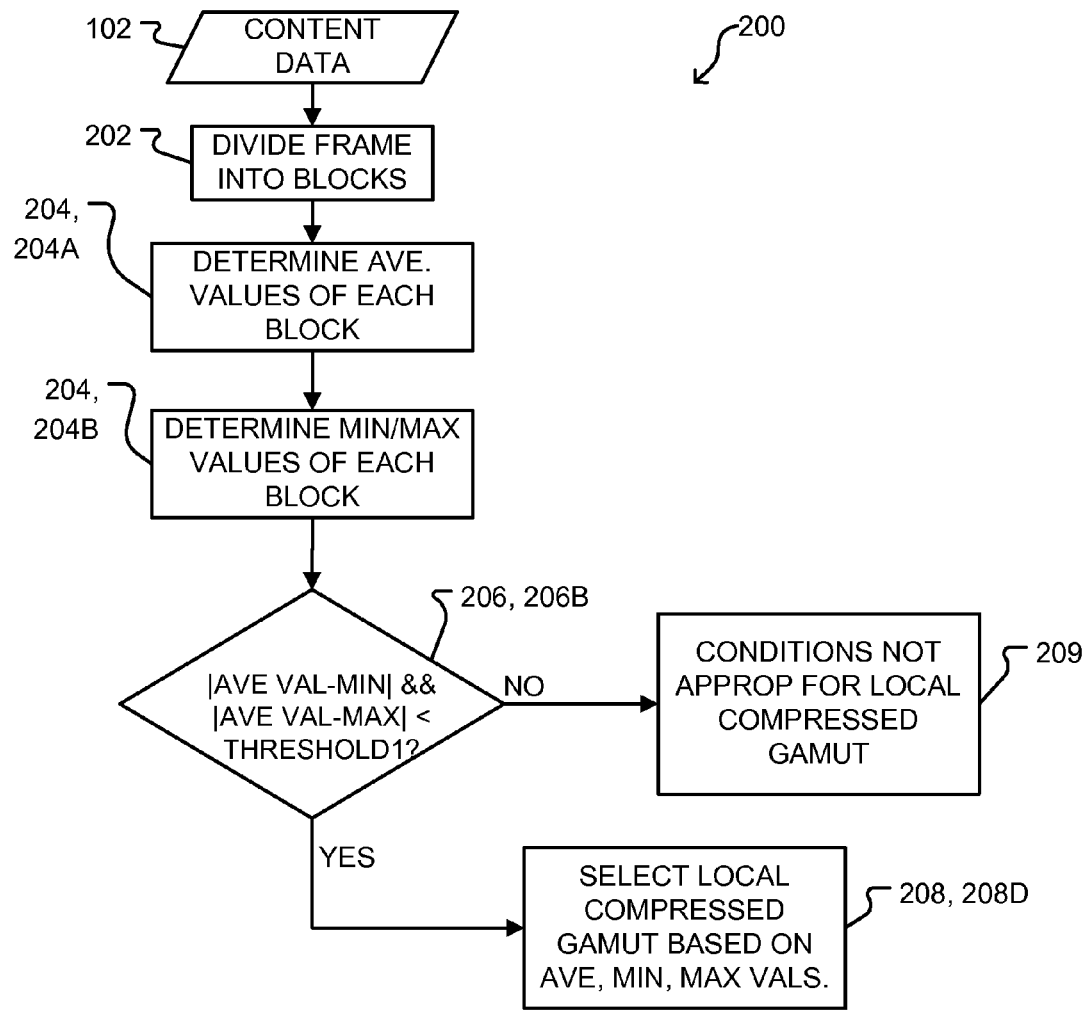
FIGS. 3A, 3B and 3C are flow charts of methods of selecting localized gamut definitions according to example embodiments that may be used in the method of FIG. 2A.
Figure 3B:
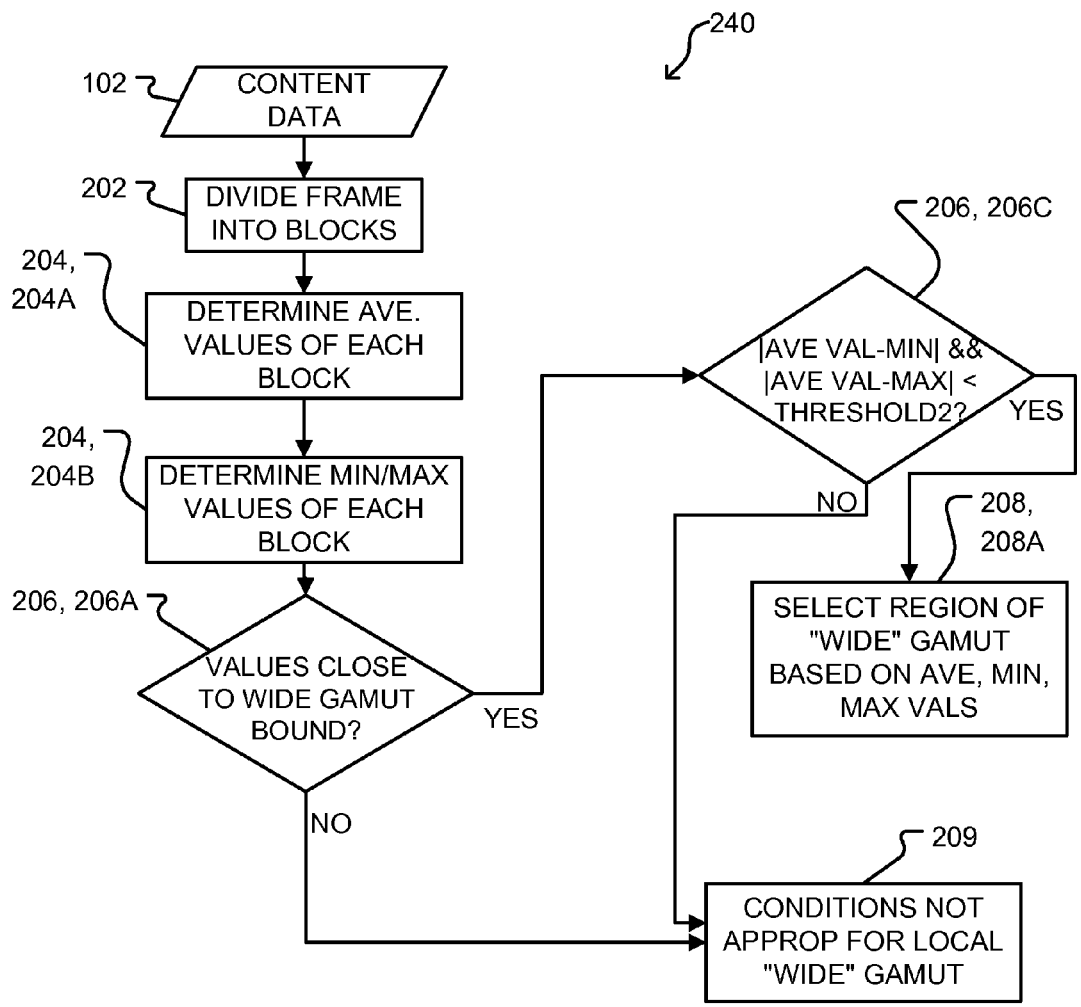
Figure 3C:
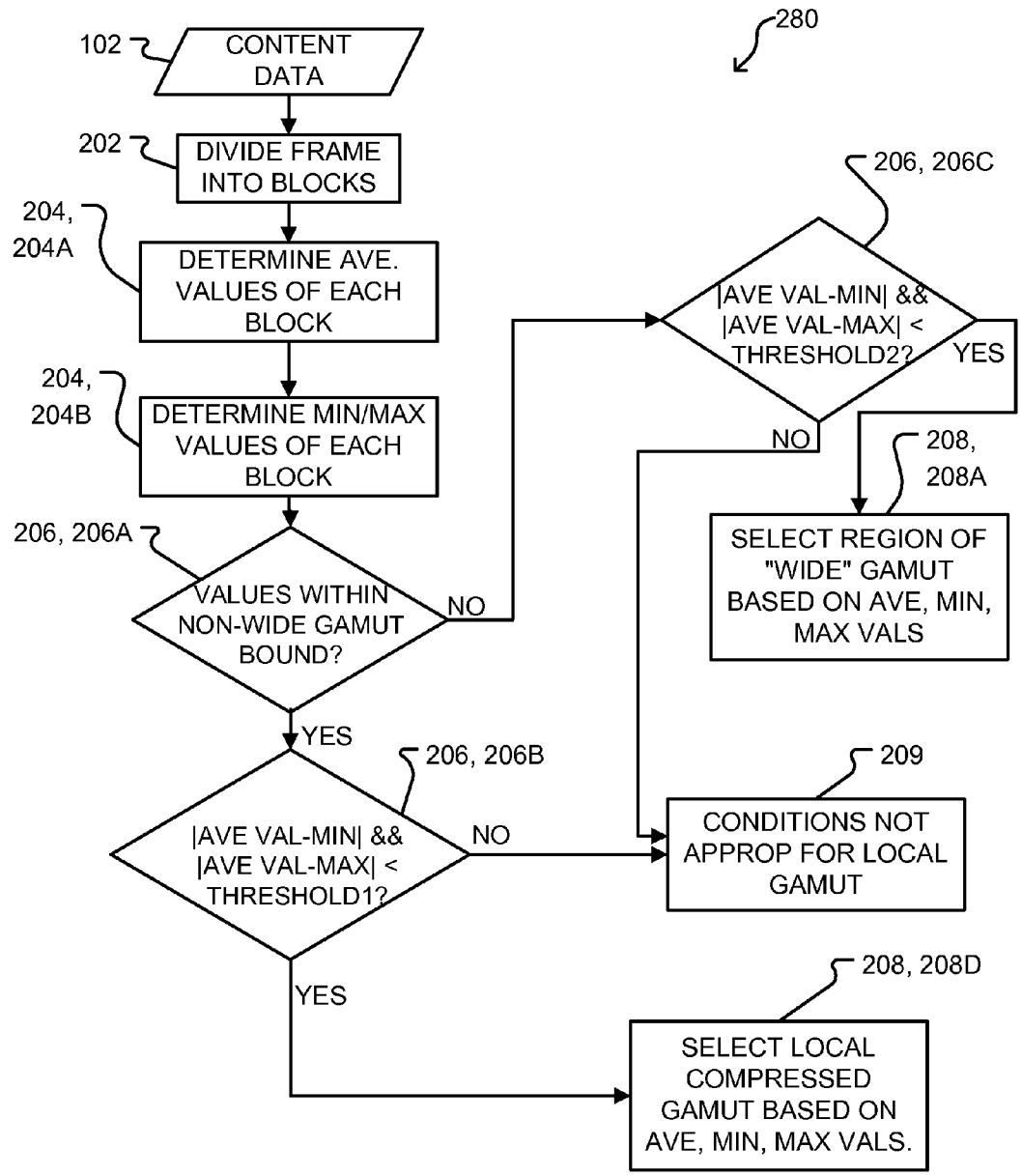
Figure 4:
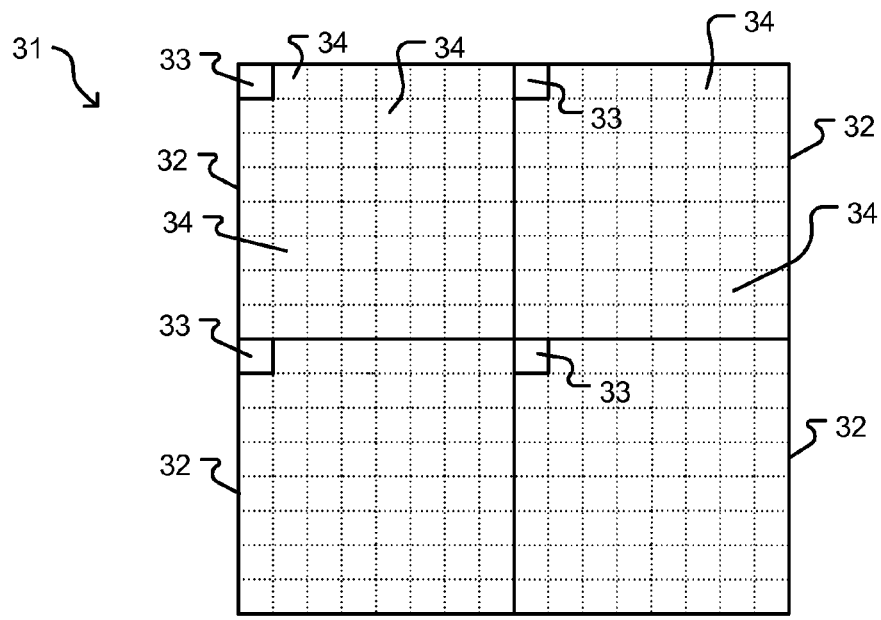
FIG. 4 shows an area of a frame of image data divided into subframe blocks.

FIGS. 3A, 3B and 3C illustrate methods 200, 240 and 280 respectively that may be applied as specific example implementations of blocks 104, 107 and 108 of method 100 (FIG. 2A) according to example embodiments. In each of methods 200, 240 and 280, a frame of content image data 102 is received and divided at block 202 into subframe blocks, each subframe block comprising N×N pixels associated with values representing color information. FIG. 4, for example, illustrates an area of a frame 31 divided into four subframe blocks 32. A frame can have substantially more then four subframe blocks as shown. In the illustrated example of FIG. 4, each subframe block 32 has 8×8 pixels. If the image data is represented in CIE LUV color space, each of the 64 pixels of a subframe block may be associated with L', u', v' values. For image data represented in other color spaces, each of the pixels may be associated with other color values.

In each of methods 200, 240 and 280, gamut characteristics for each subframe block 32 are determined at block(s) 204. Based on such gamut characteristics, one or more conditions may be evaluated at block(s) 206. If certain conditions are satisfied, localized gamut definitions are retrieved at block(s) 208.

For each of methods 200, 240 and 280, the gamut characteristics determined from image data may include a value indicative of the average color of each subframe block (as determined at block 204A). In some embodiments, such value may be the DC coefficient (i.e. DC value) of the DCT coefficient matrix, for example (see FIG. 4). Determination of a DC coefficient 33 may comprise applying a discrete cosine transform (DCT) to the pixel values in subframe block 32. The gamut characteristics of the image data may also include minimum and maximum color values of each subframe block (as determined at block 204B). Where the image data is represented in CIE LUV color space, the average values (e.g. DC coefficients 33) and minimum and maximum of each subframe block 32 may be computed separately for each of the L', u', v' components. In particular other embodiments, gamut characteristics at blocks 204 may be provided to the encoder by way of metadata in the image data or communication from an upstream device such as, for example, a color grading tool.

Methods 200, 240 and 280 differ in the conditions that are evaluated at block(s) 206 and the localized gamut definitions that are selected or generated at block(s) 208. Method 200 of FIG. 3A evaluates whether conditions are appropriate for using a localized gamut definition to facilitate data compression. Method 240 of FIG. 3B evaluates whether conditions are appropriate for using a localized gamut definition to increase color depth. Method 280 of FIG. 3C incorporates aspects of methods 200 and 240 and evaluates whether conditions are appropriate for using a localized gamut definition for facilitating data compression or to increase color depth.

Method 200 of FIG. 3A begins by dividing the frame into subframe blocks 32 at block 202 and determining gamut characteristics at blocks 204, as described above. After determining gamut characteristics at blocks 204 method 200 proceeds to block 206B by evaluating, for each subframe block 32, whether the absolute value of the differences between: (1) the average value and the minimum value, and (2) the average value and the maximum value, are respectively less than a predetermined threshold value (i.e. "THRESHOLD1"). If such differences are not less than the threshold value, then method 200 may proceed by returning an indication at block 209 that conditions are not appropriate for using a localized gamut definition. For example, the content gamut may cover such a large area that use of localized gamut definitions may not reduce the image data beyond an insignificant amount after taking into account the overhead in communicating information concerning the use of localized gamut definitions to downstream devices.

In alternate embodiments, one or more other conditions may be evaluated at block 206B of method 200 to determine whether it is appropriate to use localized gamut definitions for data compression purposes. Such other conditions may include, for example:

evaluating the area of the content gamut as a percentage of the area of the gamut of the image data format;
evaluating the volume of the content gamut as a percentage of the volume of the gamut of the image data format (i.e. considering gamut in three-dimensional color space);
evaluating the distance between average values and the boundary of the gamut of the image data format;
evaluating color characteristics of neighboring subframe blocks;
evaluating the costs and benefits of applying a localized gamut transform (e.g. costs may include visual artifacts);
evaluating the costs and benefits of applying a global gamut transform;
etc.

If the differences between the average value and minimum/maximum values evaluated at block 206B of method 200 are less than the threshold values, then method 200 proceeds by retrieving a localized gamut definition for the image data at block 208D. The localized gamut definition may be: selected from a set of predetermined localized gamut definitions, retrieved from memory, extracted from the video signal, and/or generated based on the average values and/or minimum and maximum values (or other gamut characteristics) determined at blocks 204. The localized gamut definition may have a boundary which coincides with or surrounds the content gamut.

Method 240 of FIG. 3B determines a localized gamut definition which can be used to encode image data to increase its color depth. Method 240 may be applied, for example, where the image data format has a wide gamut (a gamut broader than a conventional gamut such as the Rec. 709 format) as it may be desirable in such cases to increase the precision with which colors may be specified in the image data. As explained above with reference to FIG. 1B, encoding image data using localized gamut definitions may allow for a greater number of colors to be specified within an area of the gamut of the image data format, without necessarily increasing the bit depth of the image data.

As shown in FIG. 3B, after determining gamut characteristics at blocks 204 method 240 proceeds to block 206A by determining whether points on the boundary of the content gamut are sufficiently close to the boundary of the gamut of the image data format. If the boundary is not sufficiently close, then method 240 may proceed by returning an indication at block 209 that conditions are not appropriate for using a localized gamut definition (e.g. as the content gamut does not push the boundaries of the gamut of the wide gamut format, so it is not necessary to define a special localized gamut; however, in some embodiments, another gamut definition may be used for encoding the image data, such as, the gamut definition of a conventional or non-wide gamut format).

If the boundary of the content gamut is sufficiently close to the boundary of the gamut of the image data format, then method 240 proceeds to block 206C by evaluating whether the absolute value of the differences between: (1) the average value and the minimum value, and (2) the average value and the maximum value, are respectively less than a predetermined threshold value (i.e. "THRESHOLD2"). If such differences are not less than the threshold value, then method 240 may proceed by returning an indication at block 209 that conditions are not appropriate for using a localized gamut definition. For example, the content gamut may cover such a large area that use of localized gamut definitions may not increase the color depth beyond a significant degree.

If the differences between the average value and minimum/maximum values evaluated at block 206C of method 240 are less than the threshold values, then method 240 proceeds by retrieving a localized gamut definition for the image data at block 208A. The localized gamut definition may be selected from a set of predetermined localized gamut definitions or it may be generated based on the average values and/or minimum and maximum values (or other gamut characteristics) determined at blocks 204. The localized gamut definition may have a boundary which coincides with or surrounds the content gamut. A new color scheme may be defined for the localized gamut to increase the color depth.

In other embodiments, localized gamut definitions can be defined regardless of how near the content gamut boundary is to the gamut boundary of the image data format. However, certain operations, such as transformations based on localized gamut information, can be based on the relative relationship of the local content gamut boundary to the gamut boundary of the image data format, and/or to the local content gamut boundary of neighboring subframe blocks.

Method 280 of FIG. 3C incorporates aspects of methods 200 and 240 to retrieve localized gamut definitions to facilitate data compression or increase color depth. In method 280, similar steps to those of methods 200 and 240 are labeled with the same reference numerals. As seen in FIG. 3C, after determining gamut characteristics at blocks 204 method 280 proceeds to blocks 206 (which includes blocks 206A, 206B, 206C) by evaluating for each subframe block 32 the conditions as discussed above with reference to block 206B of FIG. 3A and blocks 206A, 206C of FIG. 3B. Based on the outcome of such evaluations, method 280 proceeds to one of the following steps as illustrated in FIG. 3C:

returning an indication at block 209 that conditions are not appropriate for using a localized gamut definition;

retrieving a localized gamut definition at block 208A to increase color depth; and retrieving a localized gamut definition at block 208D to facilitate data compression.

In some embodiments of methods 200, 240 and 280, if conditions are not appropriate for using a localized gamut definition, rather than returning an indication at block 209 method 240 may simply do nothing at block 209 (causing the image processing to proceed to the next step without selection and application of localized gamut definitions).

It is to be understood that the steps of determining and evaluating gamut characteristics and selecting localized gamut definitions (as described above for methods 200, 240 and 280) may be performed on each subframe block (or other portions) of image data. The methods may be repeated for successive frames of image data.

Figure 2C:
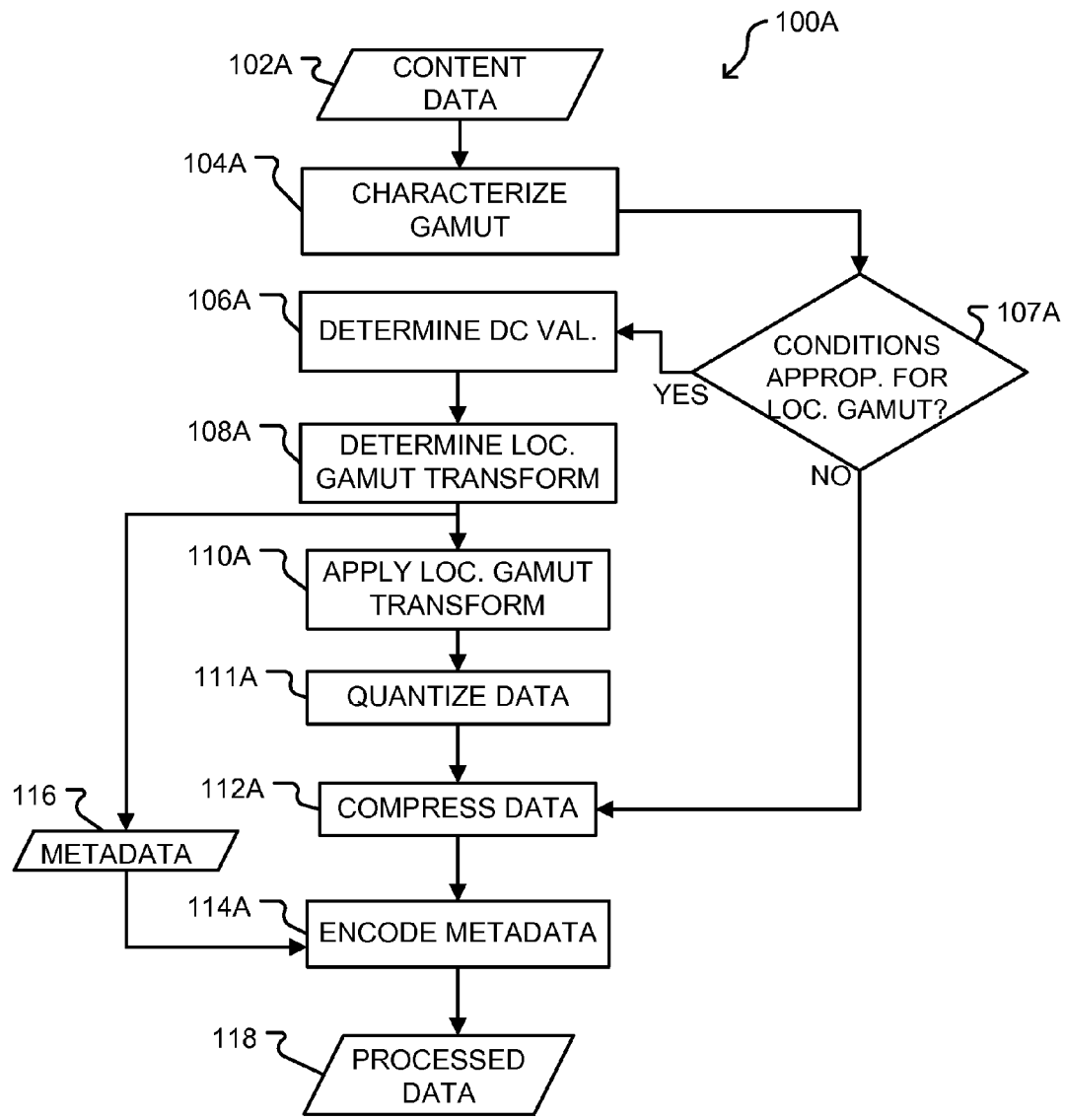

FIG. 2C illustrates an example method 100A of using localized gamut definitions to encode image data according to another embodiment. Method 100A of FIG. 2C is similar in some respects to method 100 of FIG. 2A, and similar reference numerals are used to refer to similar steps, except that the reference numerals for the steps of method 100A are appended with the letter "A." Method 100A may be performed on each frame (or area of a frame) of image data 102.

Method 100A begins by receiving a frame or area of a frame of image data 102. The content gamut of the image data 102 is characterized at block 104A. At block 107A, the gamut characterization determined at block 104A is evaluated to determine whether conditions are appropriate for applying a localized gamut transform to the image data. The steps performed at blocks 104A and 107A may be similar to those performed at blocks 104 and 107 of method 100.

If it is determined at block 107A that conditions are appropriate, then method 100A may proceed by: determining an average color coordinate value of the image data and based on such average color coordinate value, applying a localized gamut transform to the remaining color coordinate values of the image data. For example, in the illustrated embodiment of method 100A, at block 106A a discrete cosine transform (DCT) may be applied to the pixel values of the image data to determine a DC coefficient 33 (i.e. DC value) of the DCT coefficient matrix of the image data (see FIG. 4). Based on the DC coefficient 33, a localized gamut transform may be determined at block 108A. The localized gamut transform may be applied to the image data at block 110A such that the remaining values in the DCT coefficient matrix (i.e. the AC coefficients 34—see FIG. 4) tend to on average become smaller as the localized gamut transform maps the color coordinate values to new values close to the DC coefficient 33. Accordingly, upon quantization of the transformed image data at block 111A, many of the AC coefficients 34 may be quantized to zero, facilitating compression of the image data at block 112A. The localized gamut transform at block 110A does not affect the DC coefficient 33. In certain embodiments, the localized gamut transform at block 110A may be determined based on the DC coefficient of a block (or other area) within a frame, or based on the DC coefficients of a plurality of neighboring blocks within a frame (e.g. such as the average of the DC coefficients of the neighboring blocks).

The transform used in method 100A to determine a DC or average value at block 106A and to apply a localized gamut transform at block 110A is not limited to discrete cosine transforms. In other embodiments, some other transform may be applied, which begins by determining a DC or average component for the image data, and then determines, for each value, differences (or the "residue") from the average component.

To assist downstream devices in processing and decoding the image data, at block 114A metadata 116 may be embedded in the image data, or may be transmitted along with the image data. Metadata 116 may include an indication that a localized gamut transform was applied to the image data. In particular embodiments, metadata 116 may provide information about the algorithm used to determine and apply the localized gamut transform (e.g. whether the localized gamut transform was selected based on the DC coefficient of a single block within a frame or based on the DC coefficients of a plurality of neighboring blocks within a frame, etc.). The resulting transformed, compressed processed data 118A is output to a downstream device.

In other embodiments, blocks 104A and 107A of method 100A need not be performed. In such embodiments, a localized gamut transform may be performed on each subframe block (or other area) of image data based on the DC coefficient for the subframe block and/or DC coefficients for surrounding or nearby subframe blocks. Upon receiving a subframe block (or other area) of image data, the method may proceed by determining the DC coefficient for the subframe block of image data, as described at block 106A of method 100A, for example. In other embodiments, a localized gamut transform may be performed on each subframe block of image data based on gamut information as generated by a color grading tool, for example, and communicated by way of metadata transmitted in the image data.

In certain embodiments where a localized gamut transform is performed on each subframe block (or other area) of image data, metadata 116 may not need to be encoded in the image data at block 114A of method 100A. For example, a downstream device may be configured to proceed by decoding the image data on the assumption that a localized gamut transform was applied to each subframe block of image data based on a predetermined algorithm (e.g. an algorithm based on the DC coefficient for the block and/or DC coefficients for surrounding or nearby subframe blocks).

Figure 2D:
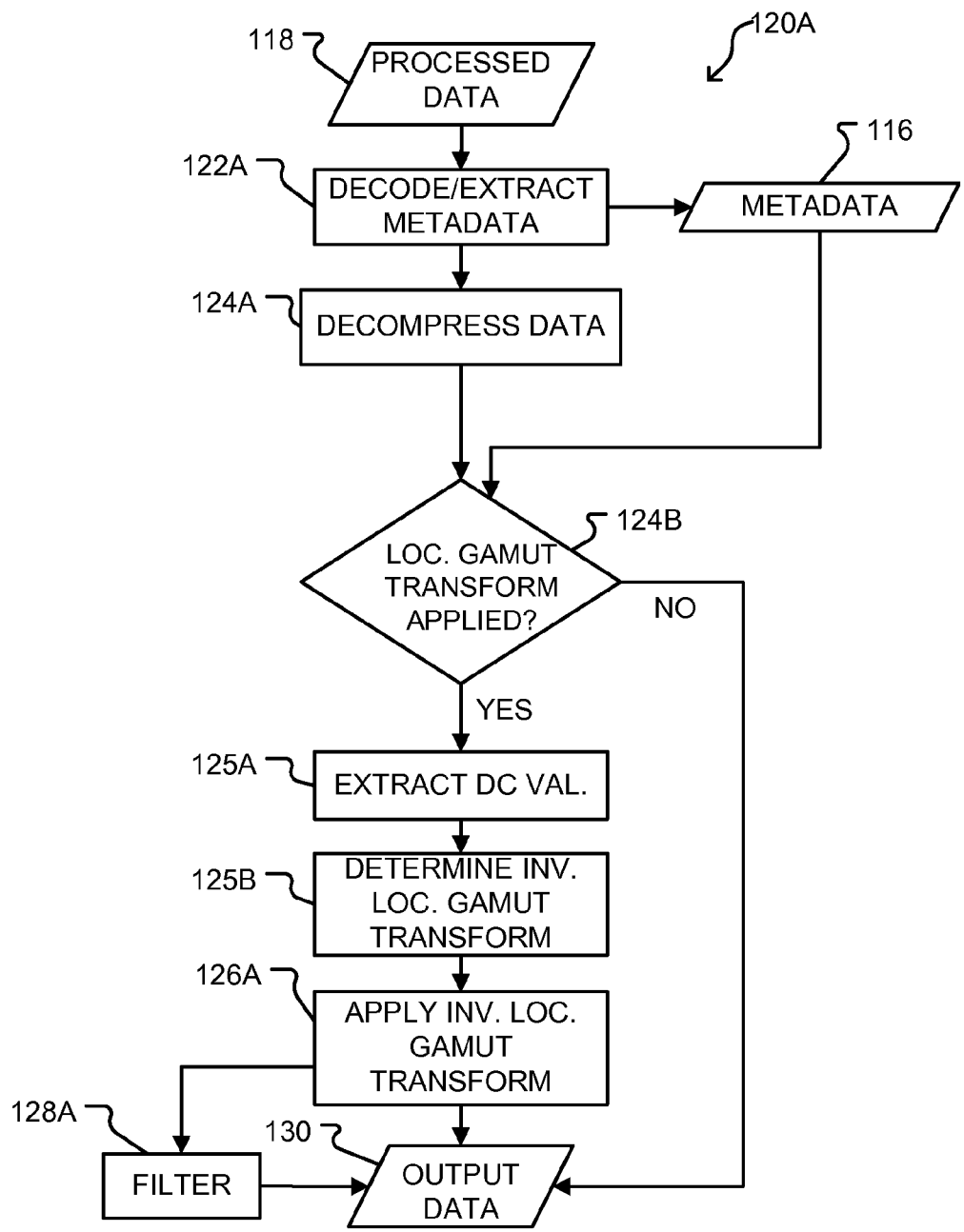

FIG. 2D shows an example implementation of a method 120A that may be performed by a display or other downstream device to decode image data that has been encoded according to method 100A of FIG. 2C, for example. Method 120A may be performed on each frame or area of a frame of processed image data 118 to prepare the image data for output to the display. Method 120A of FIG. 2D is similar in some respects to method 120 of FIG. 2B, and similar reference numerals are used to refer to similar steps, except that the reference numerals for the steps of method 120A are appended with the letter "A."

Method 120A begins by receiving a frame or area of a frame of processed image data 118. Method 120A proceeds to block 122A by extracting metadata 116 from image data 118. At block 124A, the image data 118 is decompressed. If metadata 116 indicates at block 124B that a localized gamut transform was applied to the image data, at block 125A the DC coefficient 33 is extracted from the image data (as it was not affected by the localized transform applied at block 110A of method 100A). Based on such DC coefficient 33, the inverse localized gamut transform may be determined at block 125B—i.e. based on the DC coefficient 33 (along with, optionally, metadata 116 for particular embodiments), the downstream device can ascertain the algorithm by which the localized gamut transform was determined at block 108A of method 100A. At block 126A, the inverse localized gamut transform is applied to the image data to map the color coordinate values of the applicable localized gamut definition, to color coordinate values of the image data format for reproduction on a display. In other embodiments, the block 126A transform may map from the color coordinate values of the applicable localized gamut definition, to color coordinate values within a different color space (e.g. RGB color space) for reproduction on the display.

At block 128A of method 120A, the decoded image data may be filtered to reduce visual artifacts that may appear in the image data after decoding. The resulting filtered, decoded image data is output as output image data 130 to the display.

Figure 6A:
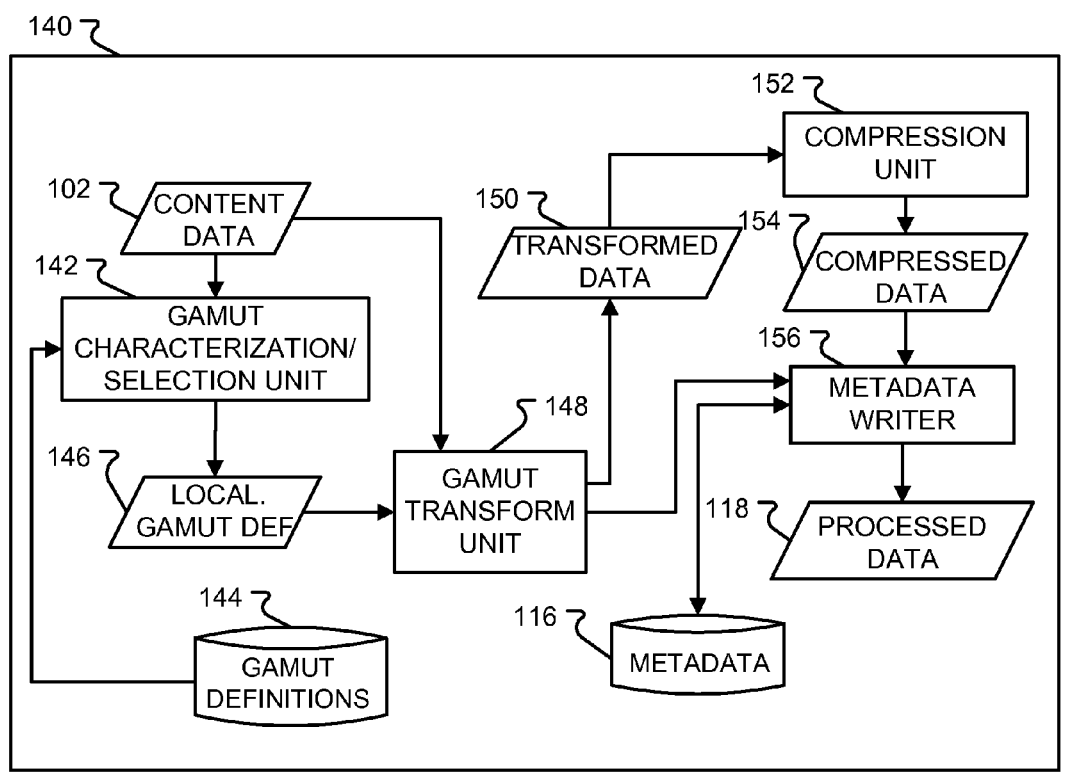
FIGS. 6A and 6B are block diagrams illustrating encoding and decoding apparatus respectively according to example embodiments.
Figure 6B:
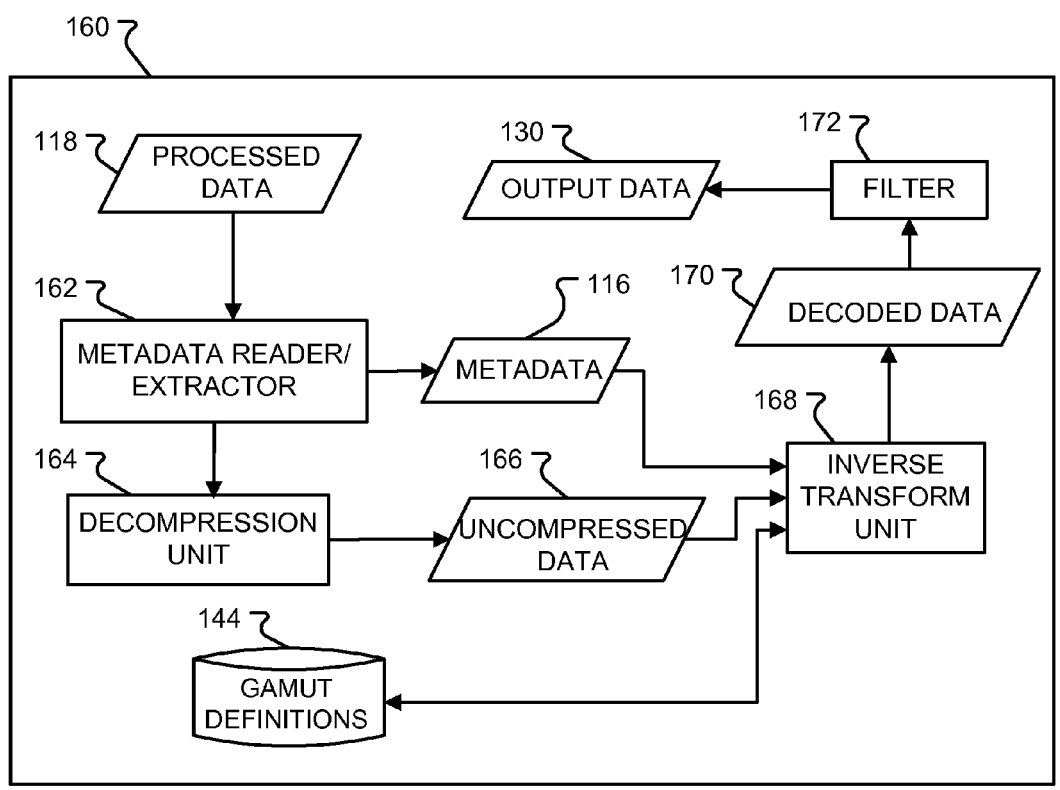

FIGS. 6A and 6B respectively illustrate encoding and decoding apparatus 140, 160 that may be used to implement one or more methods described herein. Image data that has been encoded by encoding apparatus 140 may be decoded using decoding apparatus 160. Encoding apparatus 140 may implement, for example, one or more of methods 100 (FIG. 2A), 100A (FIG. 2C), 200 (FIG. 3A), 240 (FIG. 3B) and 280 (FIG. 3C). Decoding apparatus 160 may implement, for example, methods 120 (FIG. 2B) and 120A (FIG. 2D).

In the illustrated embodiment of FIG. 6A, encoding apparatus 140 incorporates a gamut characterization and selection unit 142. Gamut characterization and selection unit 142 may be configured to perform one or more of methods 200 (FIG. 3A), 240 (FIG. 3B) and 280 (FIG. 3C), for example. Gamut characterization and selection unit 142 may be configured to receive image data 102 and determine or obtain gamut characteristics of image data 102. Gamut characterization and selection unit 142 may have access to a repository of localized gamut definitions 144. Gamut characterization and selection unit 142 may execute software and/or hardware functions to evaluate the gamut characteristics of image data 102. Such evaluation may be performed on each of several subframe blocks of an image data frame. Based on such evaluation, gamut characterization and selection unit 142 may select an appropriate localized gamut definition 146 from repository 144 for encoding image data. Use of localized gamut definitions 146 may facilitate data compression or more precise reproduction of colors as described above.

Localized gamut definition 146 may be provided along with image data 102 to a gamut transform unit 148. Gamut transform unit 148 is configured to map color coordinates specified by image data 102 to corresponding color coordinates of the localized gamut definition, resulting in transformed data 150 which is provided to a compression unit 152 of encoding apparatus 140.

For some image data frames or subframe blocks, it may be determined from an evaluation of the gamut characteristics that conditions are not appropriate for using a localized gamut definition. In such cases, gamut characterization and selection unit 142 causes the image data 102 to be passed to compression unit 152, bypassing gamut transform unit 148.

Compression unit 152 is operable to compress the image data that it receives using a suitable compression technique, such as one of the compression algorithms described above. The resulting compressed image data 154 is passed to a metadata writer 156, which is in communication with gamut transform unit 148 and has access to metadata 116 in a metadata repository. Based on signals received from gamut transform unit 148, metadata writer 156 may encode metadata (e.g. metadata specifying a localized gamut definition) that will assist downstream devices in decoding the metadata. The resulting processed image data 118 including metadata 116 is then output for transmission to a downstream device.

FIG. 6B shows a downstream device (i.e. decoding apparatus 160) that may receive and decode processed image data 118 for reproduction on a display. In the illustrated embodiment, decoding apparatus 160 incorporates a metadata reader or extractor 162 configured to extract metadata 116 from the processed image data 118. The image data is subsequently provided to a decompression unit 164 for decompression. An inverse transform unit 168 receives the uncompressed data 166 and metadata 116. Guided by metadata 116, inverse transform unit 168 decodes the image data by applying the inverse of the applicable localized gamut transform to the image data. The inverse transform may map color coordinate values of the localized gamut definition, to color coordinate values of the image data format for reproduction on the display. A filter 172 filters the resulting decoded image data 170 to reduce post-decoding visual artifacts, and outputs image data 130 to the display.

Some specific ways in which the methods and apparatus according to this invention may be made available include:
  image processing chips comprising apparatus according to an embodiment of the invention;
  a set-top box, television, computer monitor, projector and/or other display incorporating decoding apparatus as described herein;
  an image data source such as a DVD player (e.g. Blu-Ray player), video player, camera, mobile phone or the like incorporating encoding apparatus as described herein;

physical or non-transitory computer-readable media comprising firmware or other computer-readable instructions which, when executed, configure a programmable processor and/or configurable logic apparatus to perform a method according to the invention;

one or more central processing units (CPUs), one or more microprocessors, one or more field programmable gate arrays (FPGAs), one or more application-specific integrated circuits (ASICs), one or more graphics processing units (GPUs), or any combination thereof, or any other suitable processing unit(s) comprising hardware and/or software capable of performing a method according to the invention; and, color grading tools incorporating encoding apparatus as described herein.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method of encoding image data for transmission to a downstream device, the method comprising:
   receiving image data, the image data having a format and a content gamut;
   determining one or more gamut characteristics of the image data;
   based at least in part on the gamut characteristics, determining a localized gamut definition for the image data; and
   applying a gamut transform to the image data wherein color coordinates specified by the image data are mapped to corresponding color coordinates of the localized gamut definition; and wherein
   a gamut of the image data having the format is a range of colors capable of being represented by the format;
   the content gamut of the image data is a range of colors present in the image data; and
   the localized gamut definition defines fewer color coordinate values than the gamut of the image data having the format.

2. A method according to claim 1, comprising compressing the image data after applying the gamut transform.

3. A method according to claim 2, comprising encoding metadata corresponding to the localized gamut definition in the image data.

4. A method according to claim 3, wherein the image data comprises a subframe block of image data.

5. A method according to claim 4, wherein the gamut characteristics comprise a value indicative of an average color of the subframe block.

6. A method according to claim 4, wherein a discrete cosine transform (DCT) is applied to the subframe block to provide a DCT coefficient matrix, and the gamut characteristics comprise a DC coefficient that is associated with the DCT and is of the DCT coefficient matrix.

7. A method according to claim 4, wherein the gamut characteristics comprise minimum and maximum color values of the subframe block.

8. A method according to claim 4, wherein the gamut characteristics comprise an area of the content gamut.

9. A method according to claim 4, wherein the gamut characteristics comprise a volume of the content gamut.

10. A method according to claim 4, wherein the gamut characteristics comprise color characteristics of neighboring subframe blocks of image data.

11. A method according to claim 1, wherein the gamut of the image data having the format is broader than Rec. 709 gamut.

12. A method according to claim 1, wherein the content gamut is a subset of the gamut of the image data having the format.

13. A method according to claim 12, wherein the localized gamut definition defines a range of colors within the content gamut.

14. A method according to claim 13, wherein the localized gamut definition has the same bit depth as the image data having the format.

15. A method according to claim 1, wherein determining one or more gamut characteristics comprises transforming the color coordinates specified by the image data to a new color space.

16. A method according to claim 15, wherein applying the gamut transform comprises transforming the color coordinates specified by the image data to a new color space.

17. A method according to claim 16, wherein the gamut transformation is non-linear.

18. A method according to claim 1, wherein:
   the content gamut represents the range of colors present in the image data that is occupied by a local group of pixels; and
   the localized gamut definition includes the range of colors within the content gamut.

19. A method of decoding image data for reproduction on a display, the image data having a format, the method comprising:
   extracting metadata from the image data, the metadata indicating a localized gamut definition;
   decompressing the image data; and
   applying an inverse gamut transform to the image data, wherein the inverse gamut transform maps color coordinate values of the localized gamut definition to color coordinate values of the image data format; and wherein
   a gamut of the image data having the format is a range of color coordinate values capable of being represented by the format;
   the localized gamut definition includes a range of color coordinate values present in the image data; and
   the localized gamut definition defines fewer color coordinate values than the gamut of the image data having the format.

20. A method according to claim 19, comprising filtering the image data after applying the inverse gamut transform to reduce the appearance of visual artifacts.

21. A method of decoding image data for reproduction on a display, the image data having a format, the method comprising:
   determining one or more gamut characteristics of the image data;
   based on the gamut characteristics, determining a localized gamut definition in which the image data is encoded;
   applying an inverse gamut transform to the image data, wherein the inverse gamut transform maps color coordinate values of the localized gamut definition to color coordinate values of the image data format; and wherein
   a gamut of the image data having the format is a range of color coordinate values capable of being represented by the format;
   the localized gamut definition includes a range of color coordinate values present in the image data; and the localized gamut definition defines fewer color coordinate values than the gamut of the image data having the format.

22. A dual modulation projector, comprising:
a processor configured to receive image data having a format, determining one or more gamut characteristics of the image data, determine a localized gamut definition for the image data, and apply a gamut transformation to the image data wherein color coordinates specified by the image data are mapped to corresponding color coordinates of the localized gamut definition; and a projector comprising a dual modulation architecture; and wherein
the processor is further configured to energize at least one modulator of the projector according to the gamut transformed image data image data;
a gamut of the image data having the format is a range of color coordinate values capable of being represented by the image data and being defined by the format;
the localized gamut definition includes a range of color coordinate values present in the image data; and
the localized gamut definition defines fewer color coordinate values than the gamut of the image data having the format.

23. The dual modulation projector according to claim 22, wherein the dual modulation architecture of the projector comprises a colored backlight arrangement.

24. The dual modulation projector according to claim 23, wherein the colored backlight arrangement comprises a light source and a modulator.

25. The dual modulation projector according to claim 23, wherein the projector is a laser projector.

26. The dual modulation projector according to claim 23, wherein the projector is a laser projector and the processor is further configured to consider metadata in performing the localized gamut transformation.

* * * * *